Aug. 10, 1948.  E. S. WELCH, JR  2,446,623
HIGH-FREQUENCY PROGRESSIVE BONDING
APPARATUS FOR PLASTIC MATERIALS
Filed Jan. 31, 1947
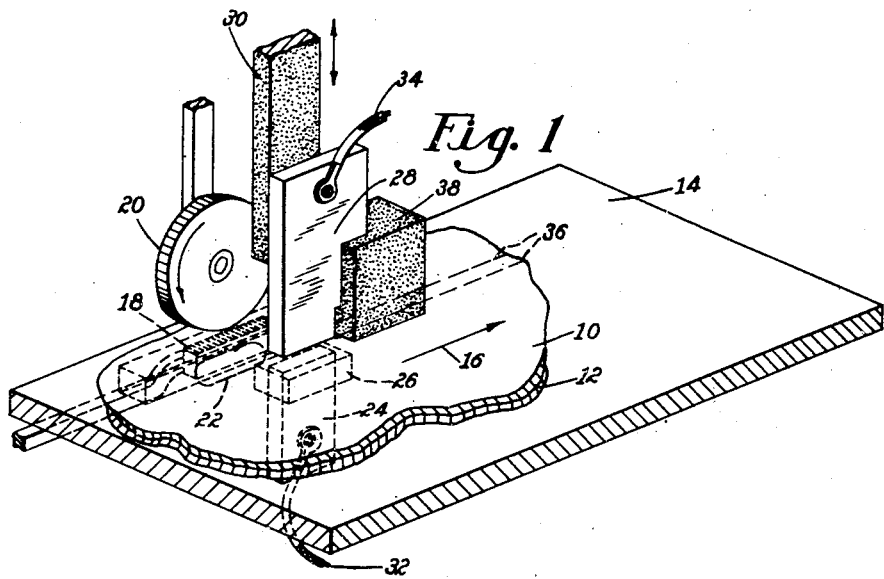
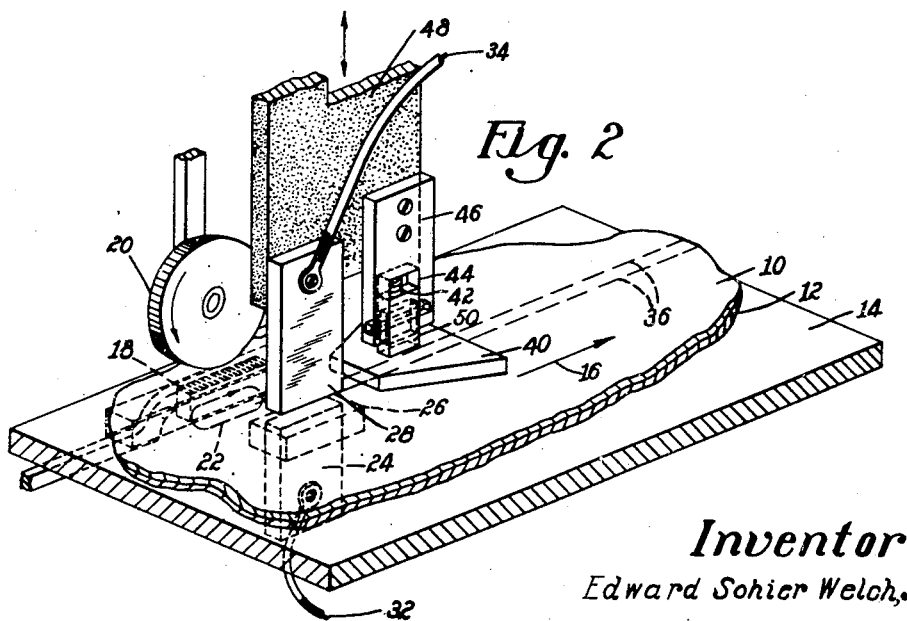
Inventor
Edward Sohier Welch, Jr
By His Attorney Patented Aug. 10, 1948

2,446,623

UNITED STATES PATENT OFFICE 2,446,623

HIGH-FREQUENCY PROGRESSIVE BONDING APPARATUS FOR PLASTIC MATERIALS

Edward Sohier Welch, Jr., Framingham, Mass., assignor to United Shoe Machinery Corporation, Flemington, N. J., a corporation of New Jersey Application January 31, 1947, Serial No. 725,628

6 Claims. (Cl. 154—42)

This invention relates to high-frequency progressive bonding apparatus of the type adapted for seaming together pieces of thermoactive sheet material in the manufacture of plastic garments or other articles of utility. It relates more particularly to progressive bonding apparatus of this type and wherein the work parts are moved forward in step-by-step manner by means of an intermittently acting work-feed mechanism, and electrodes are brought intermittently into contact with the work in successive areas for the application of the heat of a field and of pressure.

In the use of progressive bonding machines of this type on plastic sheets, there is a tendency for the relatively small electrodes to sink into the work, producing a series of disfiguring indentations which is usually accompanied by extrusion of the work material up around the edges of the electrodes. This results largely from the application of pressure between the electrodes necessary in forming a good bond between the work parts, and the fact that the work becomes heated and thus soft at the surface as well as at the interface between the parts. In some cases the amount of sinkage will be greater than in others and it will vary with changes in the temperature to which the work is heated which is often difficult to control with precision.

An object of the invention is the provision in such apparatus of improved bond-forming means in the use of which the appearance and strength of the resulting seam will be improved and will be less subject to variations in bonding temperature and other influencing factors.

In accordance with the foregoing and other objects of the invention, a feature of the invention resides in a combination comprising a lower electrode, intermittently operative work-feed mechanism, an upper electrode carried by a reciprocating drive mechanism and a hammer or pressure-applying member which may be moved up and down with the upper electrode, coming into contact with freshly bonded work areas. The advantage of the hammer lies in the resulting improved appearance and strength of the seam produced, the action being such that the work parts while still hot are flattened under pressure against the work support and are allowed to cool to a certain extent while in that condition, it being again noted that there is a certain amount of sinkage of the electrodes into the work and extrusion of the work material up around the edges of the electrodes, which in the ordinary machine is allowed to form a permanent disfigurement of the resulting seam. In accordance with the present invention, this extruded work material is largely forced back into the depression area of the seam from where it was displaced and the seam will be substantially flattened into continuity with the general surface of the work.

These and other objects, features and advantages of the invention will become more apparent from a consideration of the following detailed description taken in connection with the drawings, in which Fig. 1 is a perspective view of the operating members of a machine embodying the invention; and Fig. 2 is a perspective view of the operating members of a machine embodying an alternative form of the invention.

Referring to Fig. 1, the work parts to be bonded, comprising plastic sheets 10 and 12 placed one on top of the other, have been laid on a work support or table 14 to be advanced in the step-by-step manner in the direction of the arrow 16, by means of a four-motion feed dog 18 below the work and against which the work is pressed by a freely rolling presser wheel 20. The line of motion of the feed dog 18 is indicated approximately by the looped arrow 22 which lies in a vertical plane in the figure. The work is thus advanced over a lower electrode 24 embodied and extending through a slot 26 in the table 14. A cooperative upper electrode 28 is reciprocated into and out of contact with the work, in timed relation with the movement of the feed dog 18, by means of a well-known mechanism similar to a needle bar mechanism in a sewing machine and carrying the electrode-supporting member 30. During the process of bonding, electrodes 24 and 28 will be supplied with high-frequency energy over leads 32 and 34 extending from any suitable source of high-frequency energy, not shown in the drawing. The track of the electrodes on the work, or the seam, will then be as indicated by the dotted lines 36.

To flatten the freshly heated work parts against the work support 14 for purposes previously described and in accordance with the invention, a hammer member 38 is provided, carried by the reciprocating member 30, or, as here, conveniently mounted to electrode 28. In this instance, the hammer member 38 is formed of a block of any suitable dielectric material, such as Mycalex or Bakelite. Where it is found desirable, in order to provide for the application of an initial bonding pressure to the work between the electrodes the bottom surface of the hammer 38 will be raised a short distance above the bottom of the electrode 28. In this case the hammer will not contact the work until the electrode 28 has sunk a certain distance, however slight, into the work.

Where it is desirable to accelerate the cooling of the work parts following heating between the electrodes, as well as to provide a hammering action in the formation of a seam, the hammer may be composed of a good heat-conducting material such as copper or aluminum, as in the embodiment of Fig. 2. Here the added feature is present also of mounting a metallic hammer 40 in such a way that the electrode 28 will be relatively free of restraint in its engagement of the work.

This is accomplished by the use of a compression spring 42 retained in a vertical slot 44 formed in a supporting member 46. The latter is attached to a dielectric piece 48 forming the lower part of the upper electrode-carriage mechanism. The lower end of the spring 42 abuts against the upper surface of a rectangular pin 50 integral with the hammer 40 and suitably retained, as by keying, in the slot 44. The hammer 40 is given the shape indicated, by which it is relatively narrow near the electrode 28 and widens toward its opposite side, for the purpose of permitting the hammer fully to cover the seam when turning corners, without making the work-contacting area of the hammer unduly large. The unit pressure of the hammer against the work may thereby be as great as may be required without requiring shortening the hammer 40 in the direction of the seam line, as would be the case were the hammer rectangular in shape.

In the operation of the apparatus of Fig. 2, when the electrode 28 and the hammer 40 have been raised out of contact with the work, because of free extension of the spring 42, the bottom surface of the hammer 40 will extend preferably somewhat lower than that of the electrode 28, in order that the spring 42 may be under compression by the time the electrode 28 is again brought into contact with the work. The arrangement will be seen to be such that the deeper the electrode 28 penetrates into the work during the formation of a bond, the greater will be the resistance to penetration offered by the hammer 40 and spring 42, and furthermore, the greater will be the force applied to the work by the hammer 40 in restoring the now greater amount of extruded work material back into the depression formed by the electrode. The hammer 40, being of heat conducting material, will facilitate cooling of the work and therefore will accelerate the strengthening of the bond to prevent the parts from separating in instances where the work is stiff or is handled in such a way that the parts will be subjected to a separating force shortly after being bonded together. The insertion of the spring 42 has the additional advantage that during the transition from a section of the work of one thickness to one of another thickness there will be a period of time when the hammer 40 and the electrode 28 will be displaced vertically by a different relative amount than in the usual instance where the work is continuously of one thickness.

These and other aspects of the invention will be apparent to those skilled in the art, having considered the description of the invention herein set forth.

Having thus described my invention, what I claim as new and desire to secure by Letters Patent of the United States is:

1. In high-frequency progressive electric bonding apparatus, the combination comprising a support over which the work may be moved, intermittently operative work-moving means, a lower electrode embodied in said support, a cooperative electrode mounted above said lower electrode, means for reciprocating said cooperative electrode into contact with and away from the work intermittently, and a hammer of greater width than said electrodes and carried by said reciprocating means, said hammer being positioned with respect to the direction of feed to press the work intermittently against said support in an area previously acted upon by said electrodes.

2. Apparatus in accordance with claim 1 in which said hammer comprises a block of heat-conductive material insulated from said cooperative electrode.

3. Apparatus in accordance with claim 1 in which said hammer comprises a block of heat-conducting material the width of which is greater on the side away from said electrodes than that nearest said electrodes, said hammer being insulated from said electrodes.

4. In high-frequency progressive bonding apparatus, the combination comprising a work support embodying an electrode and over which the work parts to be bonded may be passed, intermittent work-feed mechanism, a cooperative upper electrode, carriage means for reciprocating said upper electrode up and down in timed relation with the operation of said work-feed mechanism, to move said upper electrode into contact with the work during periods when it is not in motion and away from the work during the intervening periods when it is being advanced by said work-feed mechanism, and pressure-applying means supported by said carriage means, beyond said electrode, for applying pressure to the work against said support in an area of the work just previously heated by said electrodes, thereby acting to improve the qualities of the seam between the work parts while the heated work material is setting.

5. Apparatus as in claim 4 wherein said carriage means embodies a spring for determining the pressure of said applying means against the work relative to the pressure applied by said upper electrode.

6. In high-frequency progressive bonding apparatus, the combination comprising a work support over which the work may be moved, step-by-step work-feed mechanism, electrode means positioned at an operating point for heating the work under pressure in successive localized areas as the work is so moved to form a seam, and a work-hammering member positioned and operated intermittently in timed relation with said work-feed mechanism to flatten the freshly bonded areas of the work against said support thereby to add strength and improved appearance to the seam.

EDWARD SOHIER WELCH, Jr.

REFERENCES CITED

The following references are of record in the file of this patent:

UNITED STATES PATENTS

| Number | Name | Date |
|---|---|---|
| 2,322,298 | Johnson | June 22, 1943 |
| 2,432,412 | Hacklander | Dec. 9, 1947 |